Patented Aug. 23, 1949

2,479,957

UNITED STATES PATENT OFFICE 2,479,957

PRODUCTION OF VINYL FLUORIDE POLYMERS

Arthur E. Newkirk, Schenectady, N. Y., assignor to General Electric Company, a corporation of New York No Drawing. Application February 13, 1945, Serial No. 577,728

2 Claims. (Cl. 260—92.1)

The present invention relates to the production of vinyl fluoride polymers.

It has been reported in the literature that vinyl fluoride shows no tendency to polymerize and in a recently issued patent to Thomas 2,362,960, granted November 14, 1944, the statement is made that vinyl fluoride when heated in the presence of a peroxide catalyst, for example, benzoyl peroxide, undergoes substantially no polymerization.

In accordance with my invention I have found that vinyl fluoride may be polymerized and polymers of vinyl fluoride produced by either (1) subjecting vinyl fluoride to the action of ultraviolet light or (2) by using a peroxide catalyst, for example, benzoyl peroxide, and polymerizing the vinyl fluoride in the presence of a solvent in which both the catalyst and monomer are soluble, for example, acetone, ethanol, isopropanol, etc. The polymer obtained by either method is a white, non-volatile, solid powder.

Monomeric vinyl fluoride ($CH_2=CHF$) boils at $-72.2°$ C. and may be obtained by several procedures. I prefer to prepare the monomer by reacting acetylene with hydrogen fluoride in the presence of a catalyst. An illustrative example of the preparation of vinyl fluoride is as follows:

The catalyst for the reaction is first prepared by dissolving in 350 parts by weight of boiling water, 145 parts by weight of mercuric chloride and 131 parts by weight of barium chloride dihydrate. The solution of the mixed salt is poured over 535 parts by weight of 6 to 8 mesh carbon pellets, evaporated nearly to dryness on a hot plate, thoroughly mixed and dried overnight at 125° C. The catalyst mass is then charged into a reactor and dried in a slow stream of hydrogen fluoride for eight hours starting at 100° C. and finishing at 130° C. Acetylene and hydrogen fluoride are next run through together over the hot catalyst and the effluent gases treated to remove hydrogen fluoride. As soon as the gas density of the treated effluent gases indicates an appreciable conversion of acetylene to vinyl fluoride is being obtained (molecular weight 40 or higher) the product is cooled in a dry ice-acetone bath and the reaction is continued with occasional checks on the conversion by means of a gas density balance. The crude product is mixed with ethane in an amount equal to the acetylene content of the product and then purified by fractional distillation.

As noted above, the monomeric vinyl fluoride may be converted to the polymer by (1) ultraviolet light or (2) the use of a peroxide catalyst. Typical illustrations of the preparation of the polymer by each method will now be given.

(1) Polymerization with ultraviolet light

Liquid vinyl fluoride under pressure in a quartz tube is exposed for approximately two days at 27° C. to the light from a 4 watt germicidal lamp with over 90% of the emitted radiation of wave length 2537A. Thirty-six per cent of the vinyl fluoride was converted to a solid white substance which upon analysis for carbon and hydrogen gave the following results:

|  | Calculated | Found |
| --- | --- | --- |
| Per Cent Carbon | 52.17 | 49.5 |
| Per Cent Hydrogen | 6.56 | 6.7 | indicating that the product is polyvinyl fluoride.

(2) Catalytic polymerization 364 parts by weight of the purified monomeric vinyl fluoride is charged into a 3 liter pressure vessel together with 3.64 parts of benzoyl peroxide, 360 parts by volume of acetone and 40 parts by volume of water and reacted at a temperature of 80° to 92° C. The pressure in the bomb reaches a maximum of about 550 pounds per square inch during the run but drops off to about 400 pounds per square inch at the end of 40 hours. The reaction time is 40.5 hours and the yield is 89.4 parts by weight of polymeric vinyl fluoride. Analysis of the carbon, hydrogen and fluorine content shows the product to be polymeric vinyl fluoride.

The polymer has an average molecular weight of at least 23,000 as determined by the osmotic pressure method described by Mead and Fuoss, J. Phys. Chem. 47, 59 (1943).

In place of acetone, ethanol, isopropanol or any other solvent in which both the catalyst and monomer are soluble may be used. Other peroxides, e. g., lauroyl peroxide, acetyl peroxide and the like, may be used in place of benzoyl peroxide, all of which are illustrative of preformed organic peroxide catalysts.

The polymer formed from vinyl fluoride is a soft white powder. Polymers produced by the ultraviolet method of polymerization remain white indefinitely; those produced by the peroxide catalyst polymerization slowly turn brown on standing but removal of the decomposition products of the catalyst and low molecular weight polymeric material by extraction with 95% ethyl alcohol practically eliminates the darkening of the polymer on standing and improves the stability of the polymer.

The following table shows the effect of a number of solvents and plasticizers on polyvinyl fluoride:

| Solvent Type | Solvent | |
|---|---|---|
| Hydrocarbon | benzene | Polymer insoluble on refluxing at boiling point. |
| | diphenyl | No plasticizing action when pressed together at 150° C. |
| | diphenyl methane | No plasticizing action on contact up to 100° C. |
| Chlorinated Hydrocarbon | 1, 1, 2-trichloroethane | Sl. sol. cold; sol. hot; 3% soln. a soft gel at room temperature. |
| | 1, 1, 2, 2-tetrachloroethane | Sol. hot; gel forms on cooling; polymer darkens in hot soln. |
| | pentachloroethane | Sl. sol. hot; ppt. on cooling; polymer darkens in hot soln. |
| | trichloroethylene | Insol. cold and at boiling point. |
| | hexachlorobutadiene | Insol. cold; v. sl. sol. hot; polymer darkens in hot soln. |
| | chlorobenzene | Sol. hot without darkening; gel forms on cooling. |
| | benzotrichloride | Sl. sol. hot; ppt. on cooling; polymer darkens in hot soln. |
| Ketone | acetone | Sl. sol. |
| | fenchone | Sl. sol. cold; sol. hot; ppt. on cooling. |
| | phorone | Sl. sol. cold; sol. hot; gel forms on cooling. |
| | isophorone | Sl. sol. cold; sol. hot; ppt. on cooling. |
| | cyclohexanone | Sl. sol. cold; sol. hot; gel forms on cooling. |
| Ester | dibutyl phthalate | No plasticizing action on contact up to 100° C. |
| | tri-m-cresyl phosphate | No plasticizing action on contact up to 100° C. Soluble hot, ppt. on cooling. |
| Ether | diethyl ether | Insoluble. |
| | dioxane | Sol. hot. |
| Miscellaneous | ethanol | V. sl. soluble hot. |
| | methyl trichlorostearate | Insoluble; polymer decomposes when mixture is heated. |
| | methyl hexachlorostearate | Insoluble; polymer decomposes when mixture is heated. |

A sample of polyvinyl fluoride prepared by irradiation of the monomer with ultraviolet light has remained white for over a year whereas samples prepared by the peroxide catalytic polymerization generally turned more or less brown in several months. The ultraviolet polymerized sample remained unchanged when placed in an oven at 150° C. for 24 hours and was only very slightly brown after 36 hours. A sample polymerized with the aid of benzoyl peroxide as catalyst (but not extracted with alcohol) became light red-brown in color after 1.3 hours at 150° C. The stability of polyvinyl fluoride is therefore very good but its decomposition is very actively catalyzed by the presence of small amounts of foreign material.

Increased color stability may be imparted to polyvinyl fluoride by incorporating with the polymer in an amount equal to 2% of the weight thereof stabilizers of the type heretofore used in vinyl chloride polymers. Examples of such stabilizers are oxides, e. g., magnesium oxide, stearates, e. g., calcium stearate, etc.

When heated with a gas flame, polyvinyl fluoride melts and then burns with a yellow, very sooty flame. The burning continues for several seconds after removal of the flame and then ceases.

Compared to polyvinyl chloride which decomposes at elevated temperature (e. g., 175° C.) in air at a constantly increasing rate, polyvinyl fluoride, after a rapid initial loss decomposes at a constant rate much less than that of polyvinyl chloride. After approximately three hours the polyvinyl fluoride shows a smaller total per cent decomposition than the best sample of polyvinyl chloride and this difference increases with time. Polyvinyl fluoride is therefore more stable toward heat than is polyvinyl chloride and is in fact much more stable than would be expected from the properties of simple organo-fluoride compounds.

What I claim as new and desire to secure by Letters Patent of the United States is:

1. The process of preparing polymeric vinyl fluoride, said polymer being a white, non-volatile, solid powder, which comprises reacting under heat and pressure monomeric vinyl fluoride as the sole polymerizable monomer in the presence of a preformed organic peroxide catalyst and a solvent for both the monomer and the catalyst until said polymer has been obtained.

2. The process of preparing polymeric vinyl fluoride, said polymer being a white, non-volatile, solid powder, which comprises reacting under heat and pressure, monomeric vinyl fluoride as the sole polymerizable monomer and benzoyl peroxide in the presence of acetone until said polymer has been obtained, and extracting the decomposition products of the catalyst and the low molecular weight polymeric material from the said polymeric vinyl fluoride with ethanol.

ARTHUR E. NEWKIRK.

REFERENCES CITED

The following references are of record in the file of this patent:

UNITED STATES PATENTS

| Number | Name | Date |
|---|---|---|
| 1,425,130 | Plauson | Aug. 8, 1922 |
| 1,874,107 | Lawson et al. | Aug. 30, 1932 |
| 2,344,785 | Owens et al. | Mar. 21, 1944 |
| 2,362,960 | Thomas | Nov. 14, 1944 |
| 2,404,791 | Coffman et al. | July 30, 1946 |
| 2,406,837 | Johnston | Sept. 3, 1946 |
| 2,419,010 | Coffman et al. | Apr. 15, 1947 |

OTHER REFERENCES

Starkweather, article in Jour. Am. Chem. Soc., vol. 56, pages 1870–1874 (1934).